United States Patent [19]

Matsuoka

[11] Patent Number: 5,737,223
[45] Date of Patent: Apr. 7, 1998

[54] POWER STEERING APPARATUS

[75] Inventor: Hirofumi Matsuoka, Kyoto, Japan

[73] Assignee: Koyo Seiko Co., Ltd., Osaka, Japan

[21] Appl. No.: 615,753

[22] Filed: Mar. 12, 1996

[30] Foreign Application Priority Data

Mar. 13, 1995 [JP] Japan ................................. 7-052899

[51] Int. Cl.⁶ ........................... B62D 5/09; H02P 1/04
[52] U.S. Cl. ..................... 364/424.051; 364/424.052; 180/442; 180/443; 318/432; 318/434
[58] Field of Search ............... 364/424.051, 424.052, 364/424.053; 180/422, 442, 443, 446, 412, 414, 415; 318/432, 434

[56] References Cited

U.S. PATENT DOCUMENTS

| | | | |
|---|---|---|---|
| 4,392,540 | 7/1983 | Michio et al. | 180/422 |
| 5,372,214 | 12/1994 | Haga et al. | 180/422 |
| 5,467,281 | 11/1995 | Iwashita et al. | 701/41 |
| 5,558,177 | 9/1996 | Inaguma et al. | 180/429 |

FOREIGN PATENT DOCUMENTS

| | | |
|---|---|---|
| 053 297 | 6/1982 | European Pat. Off. . |
| 6-263055 | 9/1994 | Japan . |

*Primary Examiner*—Tan Q. Nguyen
*Attorney, Agent, or Firm*—Darby & Darby

[57] ABSTRACT

In a power steering apparatus is disclosed, in which a current control outputs a voltage to be applied to an electric motor so as to set a current flowing in an electric motor to a predetermined current value by feedback of a motor current detected by a motor current detection circuit, while a motor application voltage indicator indicates a voltage to be applied to the electric motor. And a motor application voltage selector selects the lower of the voltage outputted by the current control and the voltage indicated by the motor application voltage indicator as the voltage to be applied to the electric motor and supplies the selected voltage to a motor drive circuit for driving the electric motor. Hence the apparatus needs no motor drive element of large capacity, thereby enabling to minify and reduce production cost.

3 Claims, 7 Drawing Sheets

POWER STEERING APPARATUS

BACKGROUND OF THE INVENTION

1. Field of the Invention

The present invention relates to an improvement of a power steering apparatus with the power steering operation thereof assisted using the working oil pressure generated by a hydraulic pump driven by an electric motor.

2. Description of Related Art

Figure 1:
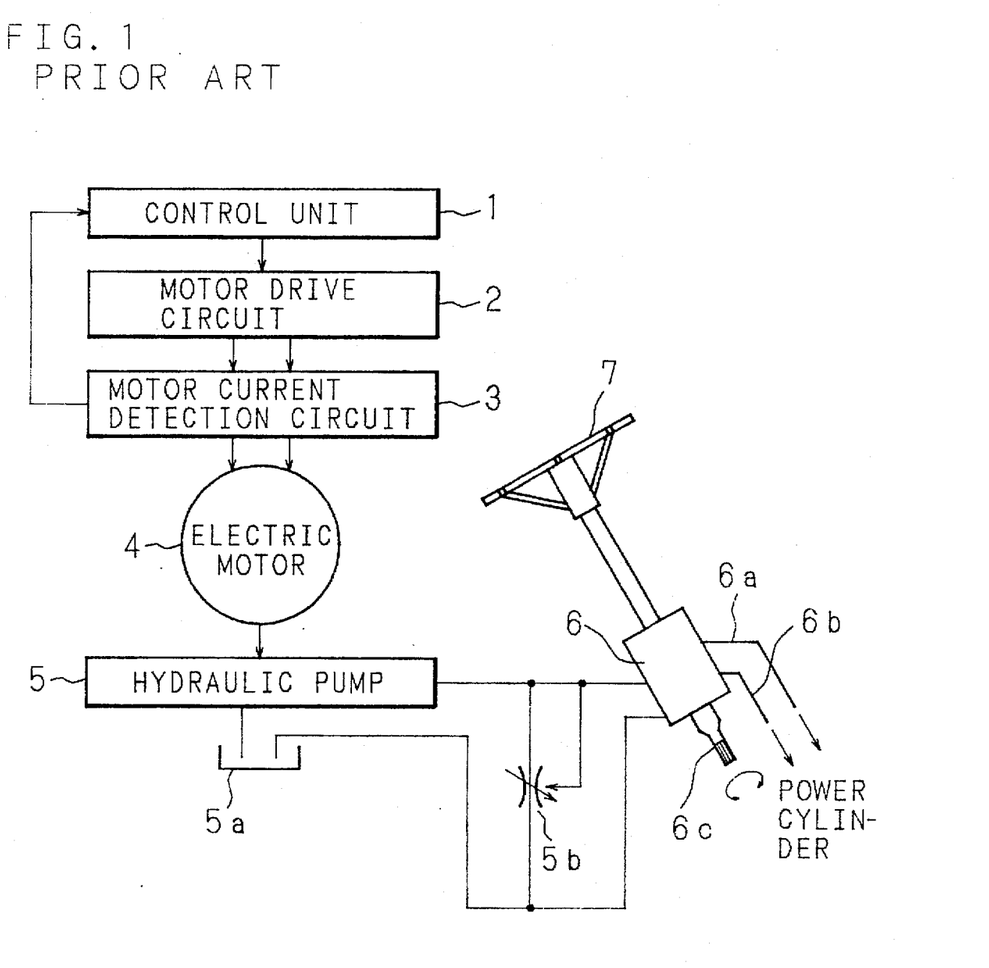
FIG. 1 is a block diagram showing a configuration of the essential parts of an example of a conventional power steering apparatus.

FIG. 1 is a block diagram showing a configuration of the essential parts of a conventional power steering apparatus for providing steering assistance using the working oil pressure generated by the hydraulic pump driven by an electric motor. In this power steering apparatus, a motor drive circuit 2 drives an electric motor 4 in accordance with the target value of application voltage designated by a control unit 1, and the electric motor 4 drives the hydraulic pump 5. Thus the hydrailic pump 5 generates the working oil pressure.

A steering wheel 7 is manipulated thereby to activate a gear unit including a pinion gear 6c provided at the lower end of a steering wheel shaft. A control valve 6 thus controls the pressure of the working oil sent tinder pressure to pipe lines 6a, 6b communicating with a power cylinder. As a result, the power cylinder is operated thereby to generate the steering assisting power in an amount and direction in which the steering wheel is manipulated.

The working oil circulates in a hydraulic circuit including the hydraulic pump 5, the control valve 6, the power cylinder, an oil supply tank 5a, and so on. A relief valve 5b is added to the hydraulic circuit to bypass the working oil to the control valve 6.

Figure 2A:
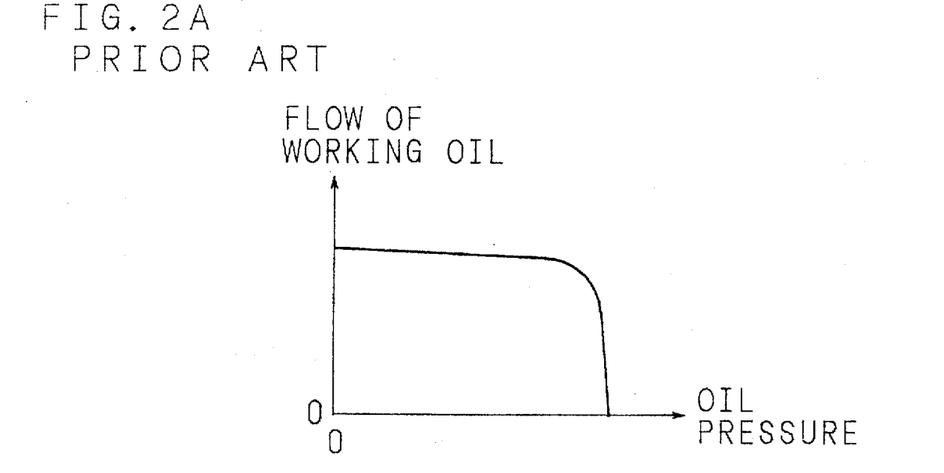
FIG. 2A is a peculiarity diagram showing an operation of a conventional apparatus.
Figure 2B:
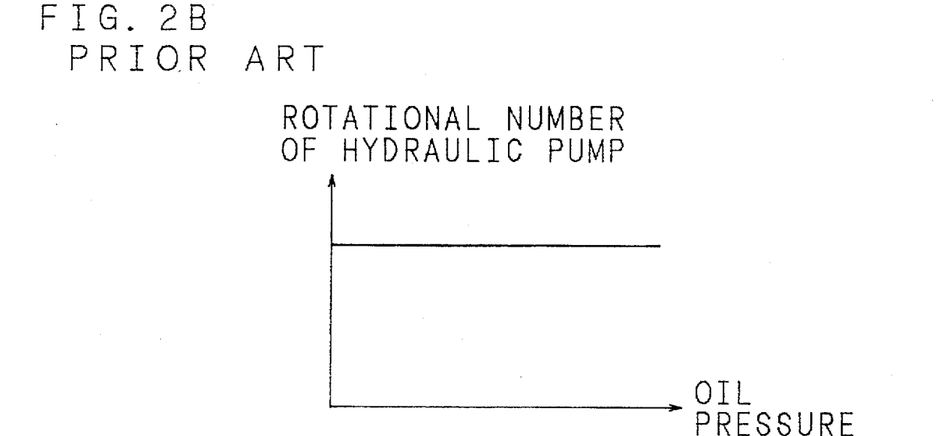
FIG. 2B is a peculiarity diagram showing an operation of a conventional apparatus.
Figure 2C:
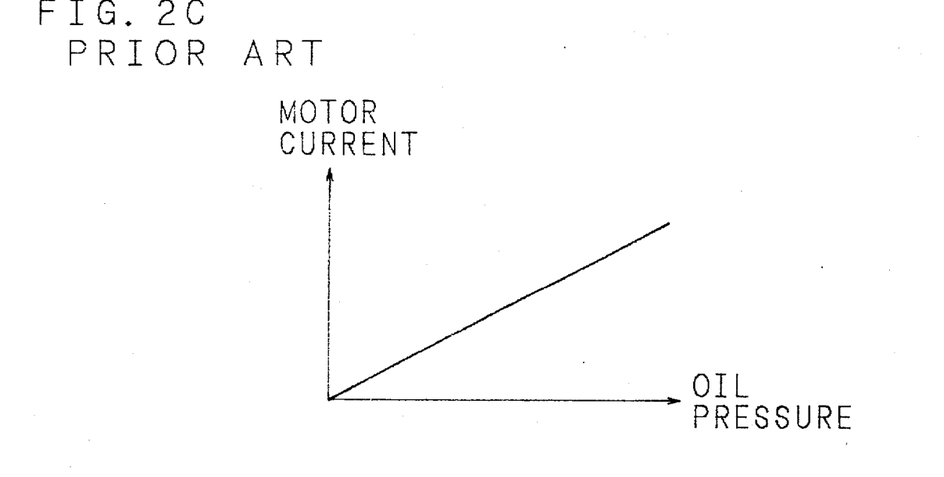
FIG. 2C is a peculiarity diagram showing an operation of a conventional apparatus.

The relief valve 5b is a valve for detour the working oil to the control valve 6 to prevent damage of hydraulic circuit when excessive current flows in the electric motor 4, and whereby the working oil pressure rises excessively, as shown in FIG. 2C, in case that the power steering operation is assisted. Since the hydraulic circuit pressure is reduced by the relief valve 5b, the rotational number of the hydraulic pump 5 is not decreased, but a flow of the working oil is decreased.

A motor current detection circuit 3 for detecting the current flowing in the electric motor 4 is interposed between the motor drive circuit 2 and the electric motor 4, and a motor current detection signal produced from the motor current detection circuit 3 is applied to the control unit 1. The control unit 1 controls by switching the voltage applied to the electric motor 4 in accordance with the motor current detection signal.

Figure 3:
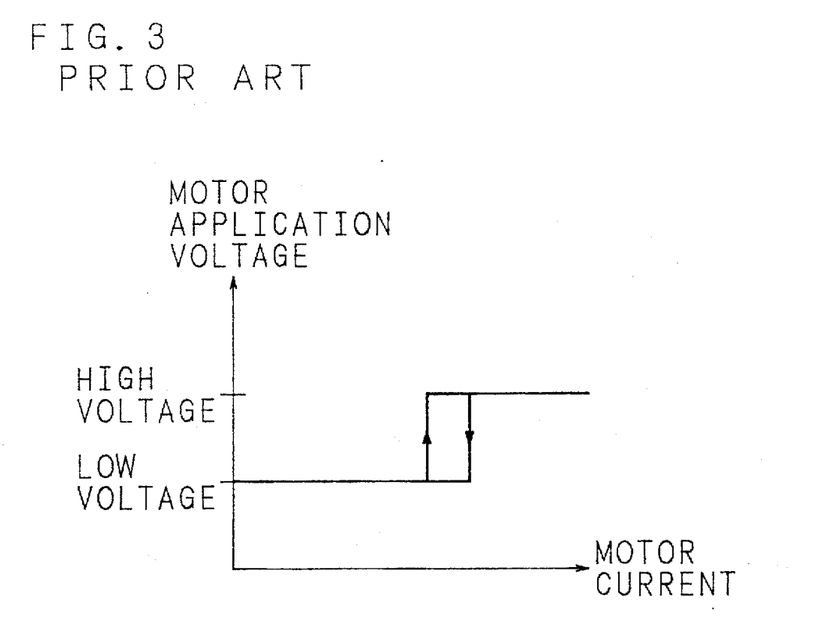
FIG. 3 is a peculiarity diagram showing relationship between motor application voltage and motor current.

With the conventional power steering apparatus having the above-mentioned configuration, the control unit 1 lowers the voltage to be applied to the electric motor 4 by one level, as shown in FIG. 3, and thus reduces the output of the electric motor 4 in order to suppress energy consumption when the steering wheel 7 is not manipulated requiring no steering assisting power (when the current flowing in the electric motor 4 is small). Assume that the control valve 6 is operated by manipulating the steering wheel 7, the working oil pressure increases for a higher load, and that the current flowing in the electric motor 4 also increases, with the motor current detection signal of the motor current detection circuit 3 reaching a predetermined value. Then, the control unit 1 raises the voltage to be applied to the electric motor 4 by one level, and thereby increases the output of the electric motor 4.

In the conventional power steering apparatus, since the voltage to be applied to the electric motor 4 is switched between two values, a large current (inrush current) flows in the electric motor 4 in switching the voltage. Thus, a motor drive element having a large capacity is needed for the motor drive circuit 2, thereby magnifying the apparatus and increasing the production cost.

Moreover, the relief valve 5b is needed when the large current flows in the electric motor 4 and the working oil pressure rises excessively.

SUMMARY OF THE INVENTION

The present invention has been developed in order to solve the above-mentioned problems, and an object of the invention is to provide a power steering apparatus which enables to minifying and decreasing production cost while a motor drive element having a large capacity and a relief valve of a hydraulic circuit are necessary.

In a power steering apparatus according to the invention, current control means outputs a voltage to be applied to an electric motor so as to set a current flowing in the electric motor to a predetermined value by feedback of a motor current detected by a motor current detection circuit. Also motor application voltage indication means indicates the voltage to be applied to the electric motor. And motor application voltage selection means selects the lower of the voltage outputted from the current control means and the voltage indicated by the motor application voltage indicating means to send it to the motor drive circuit. Hence, since a large current does not flow at switching the voltage to be supplied to the electric motor, a capacity motor drive element having a large capacity is not needed, thereby enabling to minifying and decreasing production cost.

When the predetermined value for limiting the current flowing in the electric motor is set on the basis of the pressure limit of a hydraulic circuit including a hydraulic pump, the oil pressure generating in the hydraulic pump driven by the electric motor never exceeds the pressure limit of the hydraulic circuit. Hence there is effect that a relief valve becomes useless.

The above and further objects and features of the invention will more fully be apparent from the following detailed description taken with accompanying drawings.

DESCRIPTION OF THE PREFERRED EMBODIMENTS

The invention is described in detail below with reference to the accompanying drawings showing embodiments thereof.

Figure 4:
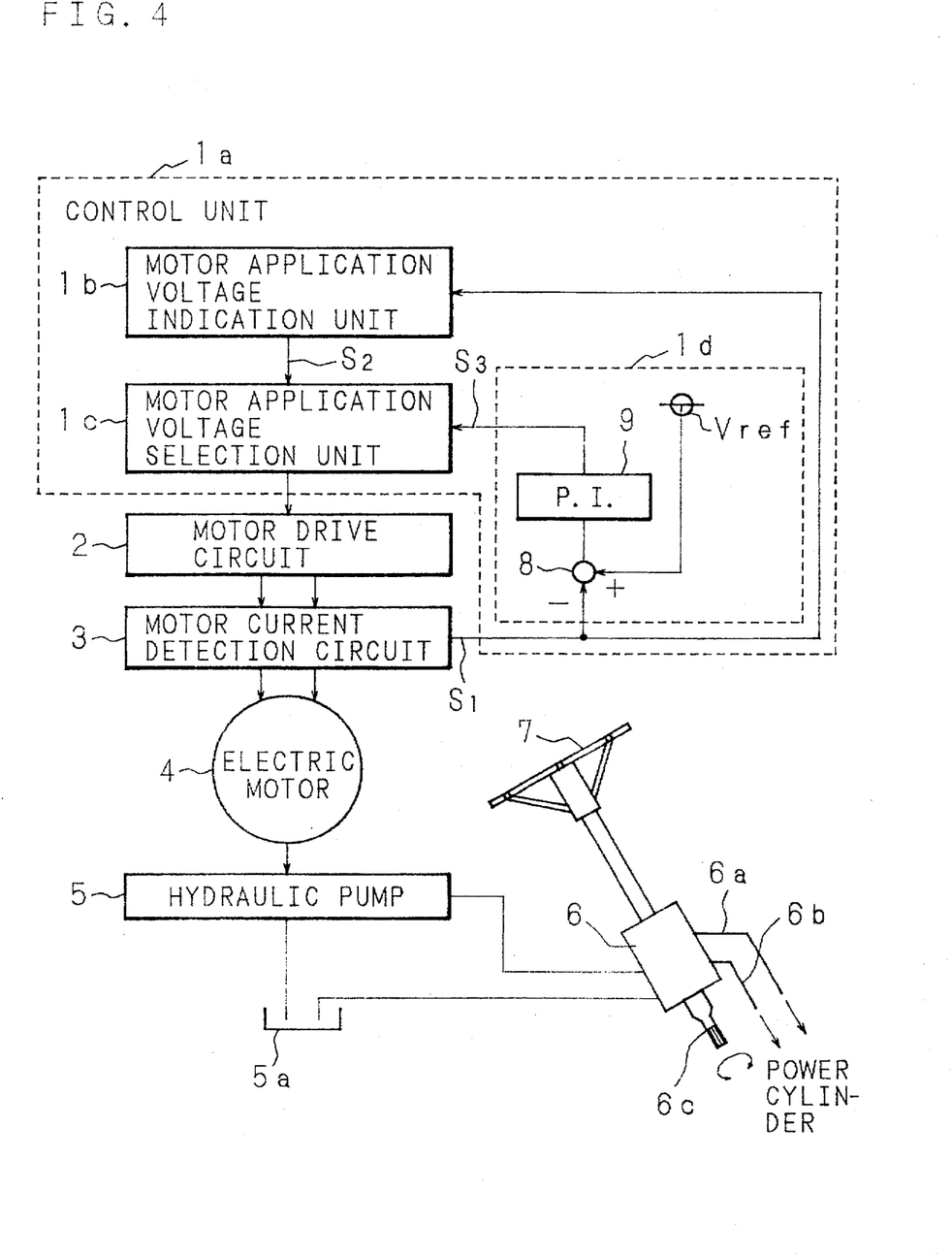
FIG. 4 is a block diagram showing a configuration of the essential parts of a power steering apparatus according to the invention.

FIG. 4 is a block diagram showing a configuration of the essential parts of a power steering apparatus according to an embodiment of the invention. In this power steering apparatus, a motor drive circuit 2 rotationally drives an electric motor 4 in accordance with a application voltage indicated by a motor application voltage selection unit 1c included in a control unit 1a, and the electric motor 4 drives a hydraulic pump 5. Thus the hydraulic pump 5 generates a working oil pressure.

A steering wheel 7 is manipulated so that a gear unit including a pinion gear 6c arranged at the lower end of the steering wheel shaft is activated. A control valve 6 thus controls the pressure of the working oil supplied under pressure to pipelines 6a, 6b communicating with a power cylinder. The power cylinder is operated, thereby generating a steering assisting power in an amount and direction in which the steering wheel 7 is manipulated.

The working oil circulates in a hydraulic circuit including the hydraulic pump 5, the control valve 6, the power cylinder, an oil supply tank 5a, and so on.

Figure 5:
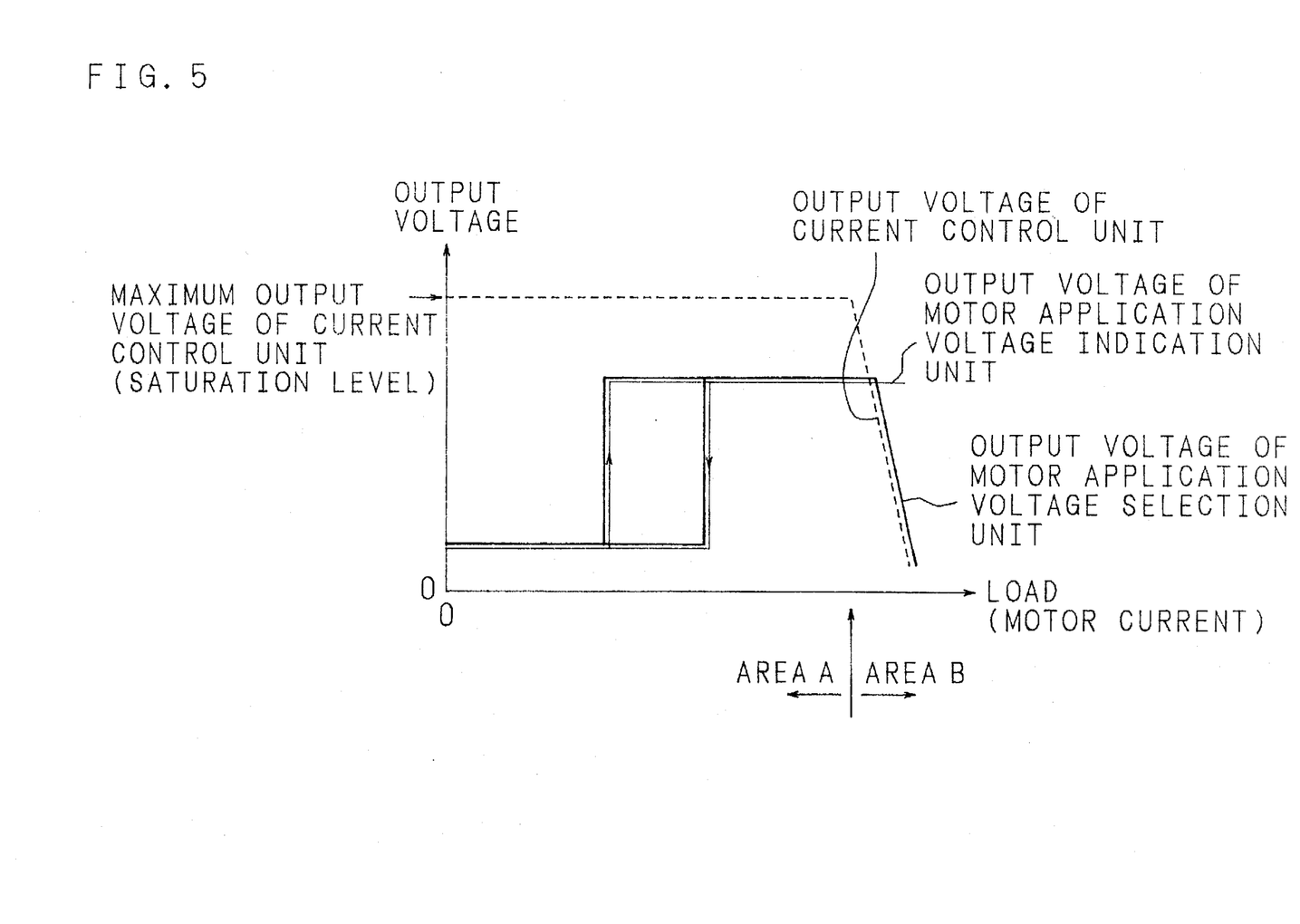
FIG. 5 is a peculiarity diagram showing relationship between motor current and motor application voltage expressed by an output signal of a motor application voltage selection unit in the power steering apparatus shown in FIG. 4.

A motor current detection circuit 3 for detecting the current flowing in the electric motor 4 is interposed between the motor drive circuit 2 and the electric motor 4. The resulting motor current detection signal is applied to a motor application voltage indication unit 1b included in the control unit 1a. The motor application voltage indication unit 1b outputs a motor application voltage indication signal for indicating a low voltage or a high voltage as the voltage to be supplied to the electric motor 4 on the basis of the motor current detection signal, as shown in FIG. 5.

The motor current detection signal outputted from the motor current detection circuit 3 also is inputted to a current control unit 1d. In the current control unit 1d, a subtraction unit 8 detects a difference between a predetermined voltage Vref and the motor current detection signal. The predetermined voltage Vref is set in correspondence with the motor current set in a manner that the working oil pressure does not exceed a pressure limit of the hydraulic circuit including the hydraulic pump 5.

A P.I. element unit 9 executes proportional computation and integral computation of the difference detected in the subtraction unit 8 and calculates a sum of the proportional computation value and the integral computation value (P.I. computation value). The resulting P.I. computation value signal is inputted to a motor application voltage selection unit 1c. The motor application voltage selection unit 1c selects the lower of the voltage expressed by the motor application voltage indication signal and the voltage expressed by the P.I. computation value signal, inputted thereto and outputs a signal for expressing the selected voltage as an indication signal of voltage to be applied to the motor drive circuit 2.

The operation in the power steering apparatus above constituted will be described below.

Consider the case where the steering assisting power is not required for lack of manipulation of the steering wheel 7 (when the current flowing in the electric motor 4 is small). In order to suppress the energy consumption, as shown in FIG. 5, the motor application voltage indication unit 1b included in the control unit 1a outputs a motor application voltage indication signal for decreasing the voltage to be applied to the electric motor 4 and thereby reduces the output of the electric motor 4. Then, with the manipulation of the steering wheel 7, the control valve 6 is energized and the working oil pressure increases for an increased load, thereby increasing the current flowing in the electric motor 4. When the motor current detection signal outputted from the motor current detection circuit 3 reaches a predetermined value, the motor application voltage indication unit 1b outputs the motor application voltage indication signal for rising the voltage to be applied to the electric motor 4 by one level and thereby increasing the output of the electric motor 4.

In the current control unit 1d, the subtraction unit 8 normally receives the predetermined value Vref and the motor current detection signal outputted from the motor current detection circuit 3 and detects the difference between them. The P.I. element unit 9 executes proportional computation and integral computation of the detected difference and calculates a sum of the proportional computation value and the integral computation value (P.I. computation value). The resulting P.I. computation value signal is inputted to a motor application voltage selection unit 1c. The motor application voltage selection unit 1c selects the lower of the voltage expressed by the motor application voltage indication signal inputted from the motor application voltage indication unit 1b and the voltage expressed by the P.I. computation value signal and outputs a signal expressing the selected voltage as an indication signal of the voltage to be applied to the motor drive circuit 2. The motor drive circuit 2 drives the electric motor 4 by applying thereto the voltage in accordance with the application voltage indicated by the motor application voltage selection unit 1c, and the electric motor 4 drives the hydraulic pump 5. Thus the hydraulic pump 5 generates the working oil pressure.

FIG. 5 is a peculiarity diagram showing relationship between motor current and motor application voltage expressed by the output signal of the motor application voltage selection unit 1c. In this peculiarity diagram, within an area A where the motor current is smaller than the motor current set in a manner that the working oil pressure does not exceed the pressure limit of the hydraulic circuit including the hydraulic pump 5, which is corresponding to the predetermined value Vref, the motor application voltage selection unit 1c selects the voltage expressed by the motor application voltage indication signal from the motor application voltage indication unit 1b and outputs the motor application voltage indication signal.

On the other hand, within an area B where the motor current is larger than the motor current corresponding to the predetermined value Vref, the motor application voltage selection unit 1c selects the voltage expressed by the P.I. computation signal from the current control unit 1d and outputs the P.I. computation signal.

As a result, the motor application voltage selection unit 1c can suppress the large current (inrush current) generating at the switching the voltage to be applied to the electric motor 4.

Figure 6A:
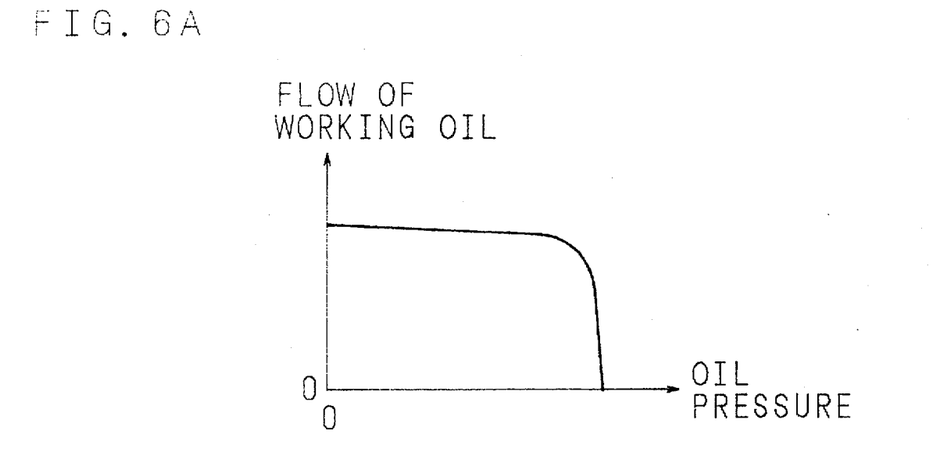
FIG. 6A is a peculiarity diagram showing an operation of the power steering apparatus shown in FIG. 4.
Figure 6B:
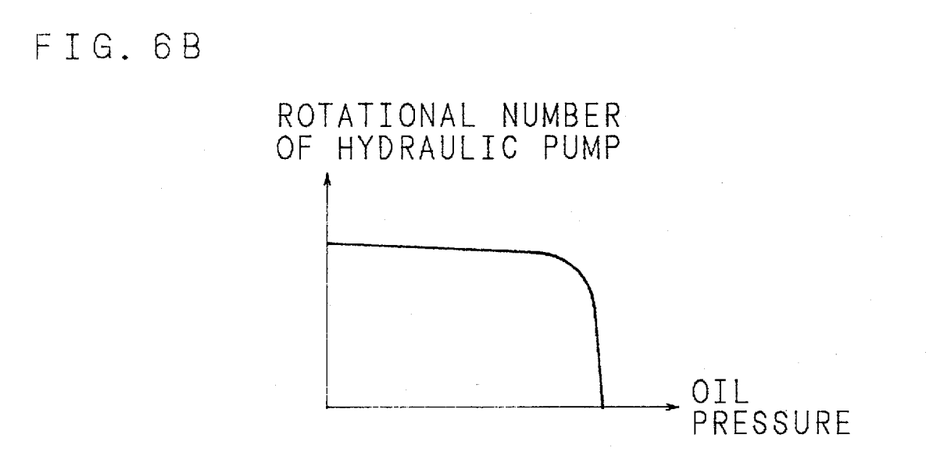
FIG. 6B is a peculiarity diagram showing an operation of the power steering apparatus shown in FIG. 4.
Figure 6C:
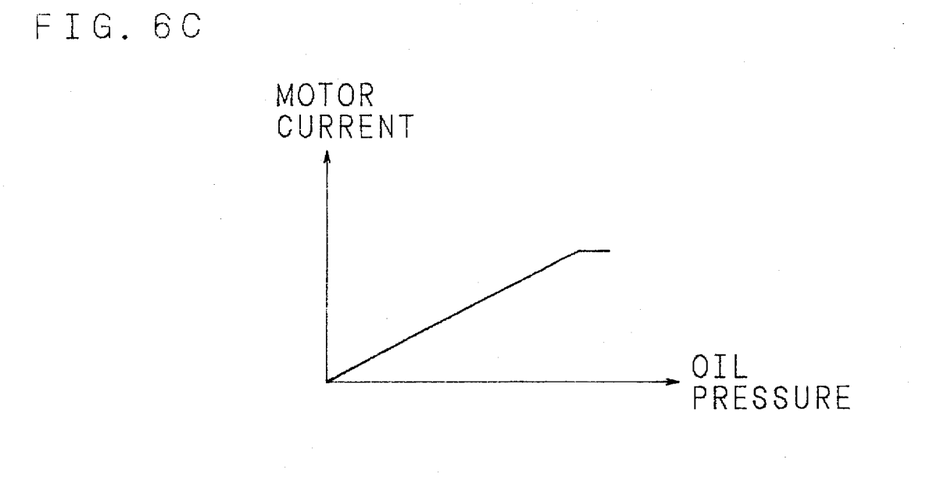
FIG. 6C is a peculiarity diagram showing an operation of the power steering apparatus shown in FIG. 4.

Consequently, when the steering operation is assisted, the working oil pressure increases with increasing of the current flowing in the electric motor 4, the motor current, however, does not exceed the current value corresponding to the predetermined value Vref, as shown in FIG. 6C. In this way the motor current is maintained within the current value corresponding to the predetermined value Vref. At this time, the rotational number of the hydraulic pump 5 is decreased as shown in FIG. 6B, the flow of the working oil is reduced, whereby the working oil pressure does not exceed the pressure limit of the hydraulic circuit including pump 5 as shown in the peculiarity between pressure-flow of the working oil of FIG. 6A. The peculiarity between pressure-flow of the working oil shown in FIG. 6A is similar to the peculiarity between pressure flow of the working oil when relief valve 5b (see FIG. 1) is in action, shown in FIG. 2A. Hence, the relief valve can be excluded in the power steering apparatus according to the invention.

Figure 7:
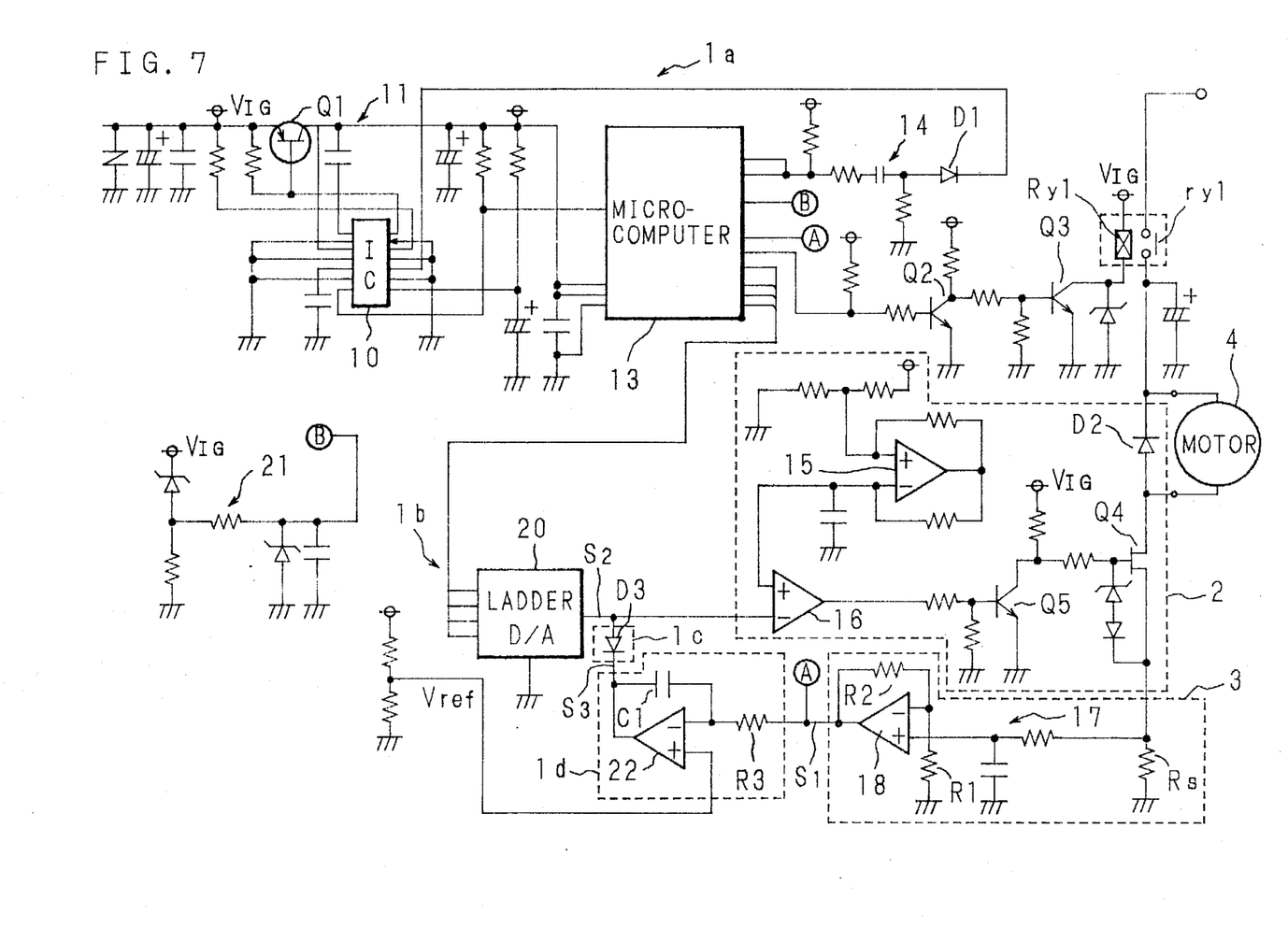
FIG. 7 is a circuit diagram showing an example circuit of a control unit, motor drive circuit and motor current detection circuit in the power steering apparatus shown in FIG. 4.

FIG. 7 is a circuit diagram showing an example circuit of a control unit 1a, motor drive circuit 2 and motor current detection circuit 3 in the steering apparatus according to the invention. A watch dog pulse for observation is applied from a microcomputer 13 included in the controller 1a to an power source IC 10 via a differentiation circuit 14 and a diode D1. The power source IC 10 feeds a reset signal to the microcomputer 13 when the watch dog pulse is in an abnormal state. A power source circuit 11 includes the power source IC 10 and a PNP transistor Q1 whose switching operation is controlled by the power source IC 10.

The microcomputer 13 switches a relay drive circuit Ry1 via NPN transistors Q2 and Q3, whose relay junction point ry1 switches on/off the electric motor 4. The relay drive circuit Ry1 is connected to a power source $V_{IG}$ which is switched off at the start of engine. Also, the microcomputer 13 is connected with a circuit 21 for detecting off-state of the power source $V_{IG}$ and stops the operation when the power source $V_{IG}$ is off. The microcomputer 13 outputs the target value of the voltage to be applied to the electric motor 4 with a digital signal of 4-bits. The digital signal is converted to an analog voltage signal (motor application voltage indication signal) $S_2$ by a D/A converter 20 made from a ladder circuit.

The analog voltage signal $S_2$ is applied to an inverting input terminal of an OP amp 16 as a comparator. A non-inverting input terminal of the OP amp 16 receives a sawtooth wave generated in a multivibrator made from an OP amp 15 and so oil. The OP amp 16 applies an output signal whose outputting time is determined by the analog voltage signal and the sawtooth wave, to an NPN transistor Q5. The NPN transistor Q5 applies the output signal and an inverted PWM (Pulse Width Modulation) signal to an FET Q4. The FET Q4 is switched on the basis of the PWM signal and flows current to the electric motor 4 at on-state. A regenerative diode D2 for flowing a regenerative current is connected to the electric motor 4 in parallel.

A resistance $R_r$ is connected between the FET Q4 and ground, the current flowing in the electric motor 4 is detected by the voltage from both terminals thereof. The voltage from both terminals of the resistance $R_r$ is applied to an non-inverting input terminal of an OP amp 18 via a smooth circuit 17 to be amplified, the amplified voltage is sent to the microcomputer 13. The microcomputer 13 outputs the target value of the voltage to be applied to the electric motor 4 on the basis of a signal (motor current detection signal) $S_1$ expressing the current flowing in the electric motor 4 with the digital signal of 4-bits indicating low voltage or high voltage as shown in FIG. 5. The digital signal is converted to the analog voltage signal (motor application voltage indication signal) $S_2$ in the D/A converter 20 made from a ladder circuit.

The above-mentioned signal (motor current detection signal) $S_1$ is also fed to an inverting input terminal of an OP amp 22 which constitutes an integral circuit with a capacitor C1. To a non-inverting input terminal of the OP amp 22 is applied the predetermined value Vref. The signal (P.I. computation signal) $S_3$ obtained by integration of the difference between predetermined value Vref and motor current detection signal is supplied to the inverting input terminal of the OP amp 16 as the comparator via a reversally connected diode D3. The diode D3 (motor application voltage selection unit 1c) selects the lower of the motor application voltage indication signal $S_2$ and the P.I. computation signal $S_3$ and outputs the selected signal to the inverting input terminal of the OP amp 16.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power steering apparatus comprising:

a control valve for controlling the pressure of the working oil for generating the steering-assisting power on the basis of the operation of the steering wheel;

a hydraulic pump for transmitting the working oil under a predetermined pressure to said control valve;

an electric motor for driving said hydraulic pump;

a motor drive circuit for driving said electric motor;

a motor current detection circuit for detecting the motor current flowing in said electric motor;

current control means for outputting a voltage corresponding to the motor current detected by said motor current detection circuit to control by feedback the motor current flowing in said electric motor;

motor application voltage indication means for indicating a voltage to be applied to said motor drive circuit on the basis of the detected motor current; and motor application voltage selection means for selecting the lower of the voltage outputted from said current control means and the voltage indicated by said motor application voltage indication means and outputting the selected voltage to said motor drive circuit.

2. A power steering apparatus according to claim 1, wherein said current control means includes:

a subtraction unit for calculating a difference between the voltage indicating the detected motor current and a predetermined value; and means for executing proportional computation and integral computation of the value calculated by said subtraction unit and supplying a sum of the proportional computation value and the integral computation value to said motor application voltage selection means.

3. A power steering apparatus according to claim 2, wherein the predetermined value is set in accordance with a pressure limit of a hydraulic circuit including said hydraulic pump.

* * * * *